US008671082B1

(12) United States Patent
Yadav et al.

(10) Patent No.: US 8,671,082 B1
(45) Date of Patent: Mar. 11, 2014

(54) USE OF PREDEFINED BLOCK POINTERS TO REDUCE DUPLICATE STORAGE OF CERTAIN DATA IN A STORAGE SUBSYSTEM OF A STORAGE SERVER

(75) Inventors: Sandeep Yadav, Sunnyvale, CA (US); Subramanian Periyagaram, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 753 days.

(21) Appl. No.: 12/394,002

(22) Filed: Feb. 26, 2009

(51) Int. Cl.
G06F 7/00 (2006.01)
G06F 17/30 (2006.01)
G06F 11/14 (2006.01)
G06F 3/06 (2006.01)

(52) U.S. Cl.
CPC ...... *G06F 17/30156* (2013.01); *G06F 11/1453* (2013.01); *G06F 3/0641* (2013.01)
USPC .......................................................... 707/692

(58) Field of Classification Search
CPC .............. G06F 11/1453; G06F 3/0641; G06F 17/30156
USPC .......................................................... 707/692
See application file for complete search history.

(56) References Cited

U.S. PATENT DOCUMENTS

| 5,210,852 | A | * | 5/1993 | Sato ........................................ 1/1 |
| 7,653,832 | B2 | * | 1/2010 | Faibish et al. ................. 714/6.32 |
| 7,747,584 | B1 | * | 6/2010 | Jernigan, IV .................. 707/692 |
| 8,099,571 | B1 | * | 1/2012 | Driscoll et al. ............... 711/162 |
| 2007/0255758 | A1 | | 11/2007 | Zheng et al. |
| 2008/0005141 | A1 | | 1/2008 | Zheng et al. |
| 2008/0005201 | A1 | | 1/2008 | Ting et al. |
| 2008/0243769 | A1 | * | 10/2008 | Arbour et al. ...................... 707/2 |
| 2009/0049260 | A1 | * | 2/2009 | Upadhyayula ................ 711/162 |
| 2009/0063795 | A1 | * | 3/2009 | Yueh .............................. 711/162 |
| 2009/0268903 | A1 | * | 10/2009 | Bojinov et al. .................. 380/45 |
| 2009/0313483 | A1 | * | 12/2009 | Ranade .......................... 713/193 |
| 2010/0121825 | A1 | * | 5/2010 | Bates et al. .................... 707/692 |
| 2011/0087874 | A1 | * | 4/2011 | Timashev et al. ............. 713/100 |

OTHER PUBLICATIONS

Co-Pending U.S. Appl. No. 13/620,684 of Yadav, S., et al., filed Sep. 14, 2012.

* cited by examiner

*Primary Examiner* — Cheyne D Ly
(74) *Attorney, Agent, or Firm* — Perkins Coie LLP

(57) ABSTRACT

A method and system for eliminating the redundant allocation and deallocation of special data on disk, wherein the redundant allocation and deallocation of special data on disk is eliminated by providing an innovate technique for specially allocating special data of a storage system. Specially allocated data is data that is pre-allocated on disk and stored in memory of the storage system. "Special data" may include any pre-decided data, one or more portions of data that exceed a pre-defined sharing threshold, and/or one or more portions of data that have been identified by a user as special. For example, in some embodiments, a zero-filled data block is specially allocated by a storage system. As another example, in some embodiments, a data block whose contents correspond to a particular type document header is specially allocated.

18 Claims, 9 Drawing Sheets

USE OF PREDEFINED BLOCK POINTERS TO REDUCE DUPLICATE STORAGE OF CERTAIN DATA IN A STORAGE SUBSYSTEM OF A STORAGE SERVER

FIELD OF THE INVENTION

At least one embodiment of the present invention pertains to storage systems, and more particularly, to a method and system for specially allocating data within a storage system when the data matches data previously designated as special data.

BACKGROUND

In a large file system, it is common to find duplicate occurrences of individual blocks of data. Duplication of data blocks may occur when, for example, two or more files or other data containers share common data or where a given set of data occurs at multiple places within a given file. Duplication of data blocks results in inefficient use of storage space by storing the identical data in a plurality of different locations served by a storage system.

A technique, commonly referred to as "deduplication," that has been used to address this problem involves detecting duplicate data blocks by computing a hash value (fingerprint) of each new data block that is stored on disk, and then comparing the new fingerprint to fingerprints of previously stored blocks. When the fingerprint is identical to that of a previously stored block, the deduplication process determines that there is a high degree of probability that the new block is identical to the previously stored block. The deduplication process then compares the contents of the data blocks with identical fingerprints to verify that they are, in fact, identical. In such a case, the block pointer to the recently stored duplicate data block is replaced with a pointer to the previously stored data block and the duplicate data block is deallocated, thereby reducing storage resource consumption.

Deduplication processes assume that all data blocks have a similar probability of being shared. However, this assumption does not hold true in certain applications. For example, this assumption does not often hold true in virtualization environments, where a single physical storage server is partitioned into multiple virtual machines. Typically, when a user creates an instance of a virtual machine, the user is given the option to specify the size of a virtual disk that is associated with the virtual machine. Upon creation, the virtual disk image file is initialized with all zeros. When the host system includes a deduplication process, such as the technique described above, the zero-filled blocks of the virtual disk image file may be "fingerprinted" and identified as duplicate blocks. The duplicate blocks are then deallocated and replaced with a block pointer to a single instance of the block on disk. As a result, the virtual disk image file consumes less space on the host disk.

However, there are disadvantages associated with a single instance of a block on disk being shared by a number of deallocated blocks. One disadvantage is that "hot spots" may occur on the host disk as a result of the file system frequently accessing the single instance of the data. This may occur with high frequency due to the fact that the majority of the free space on the virtual disk references the single zero-filled block. To reduce hot spots, some deduplication processes include a provision for predefining a maximum number of shared block references (e.g., 255). When such a provision is implemented, the first 255 duplicate blocks reference a first instance the shared block, the second 255 duplicate blocks reference a second instance, and so on.

Another disadvantage of deduplication is disk fragmentation. Disk fragmentation may occur as a consequence of the duplicate blocks being first allocated and then later deallocated by the deduplication process. Moreover, the redundant allocation and deallocation of duplicate blocks further results in unnecessary processing time and bookkeeping overhead.

BRIEF DESCRIPTION OF THE DRAWINGS

One or more embodiments of the facility are illustrated by way of example and not limitation in the figures of the accompanying drawings, in which like references indicate similar elements and in which.

DETAILED DESCRIPTION

Figure 1:
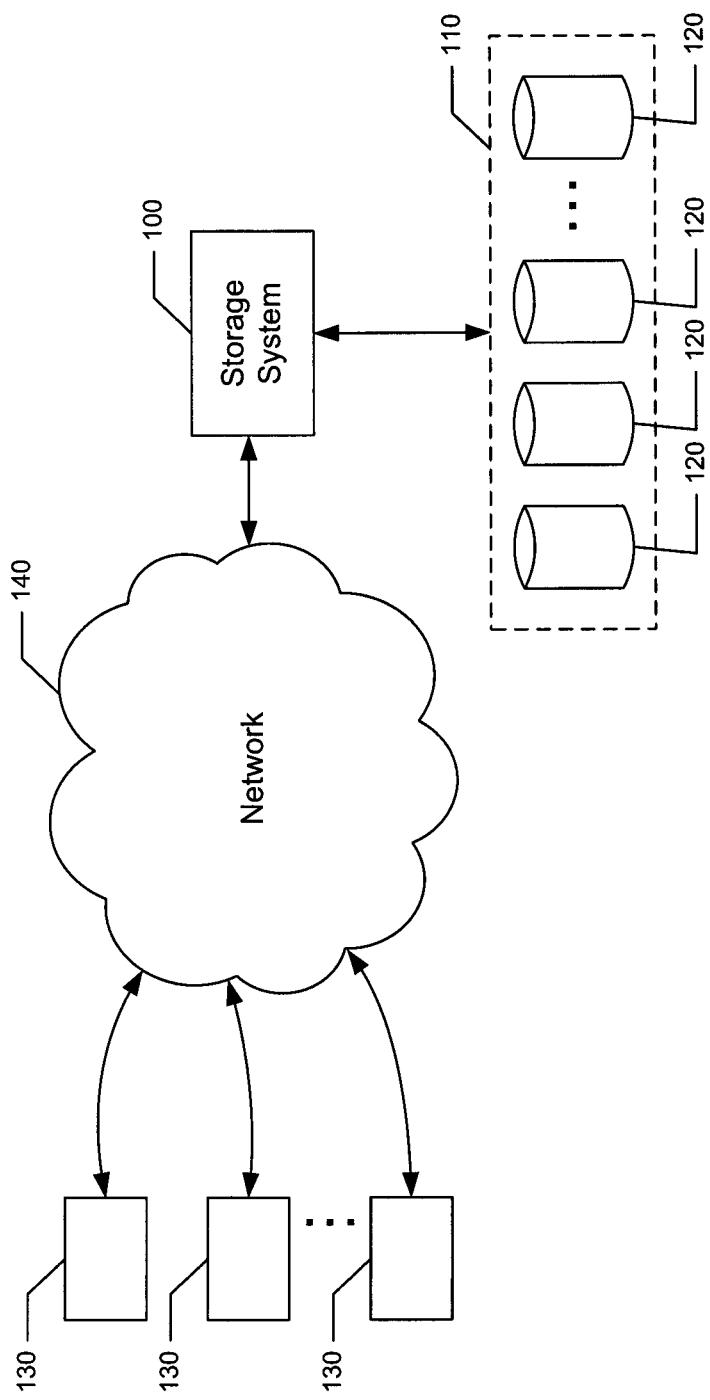
FIG. 1 is a data flow diagram of various components or services that are part of a storage network, in one embodiment.

The technology introduced herein eliminates the redundant allocation and deallocation of "special data" on disk by providing a technique for specially allocating data within a storage system. As used herein, "special data" is one or more pieces of data that have been designated as "special" within a host file system, such as one or more pieces of data that exceed a pre-defined sharing threshold. For example, in some embodiments, a zero-filled data block is specially allocated by a storage system. As another example, in some embodiments, a data block whose contents correspond to a particular type of document header is specially allocated. It is noted that the technology introduced herein can be applied to specially allocate any type of data. As such, references to particular data, such as zero-filled data, should not be taken as restrictive. It is further noted that the term "disk" is used herein to refer to any computer-readable storage medium including volatile, nonvolatile, removable, and non-removable media, or any combination of such media devices that are capable of storing information such as computer-readable instructions, data structures, program modules, or other data. It is also noted that the term "disk" may refer to physical or virtualized computer-readable storage media.

As described herein, a specially allocated data block is a block of data that is pre-allocated on disk or another non-volatile mass storage device of a storage system. It is noted that the term "pre-allocated" is used herein to indicate that a specially allocated data block is stored on disk prior to a request to write the special data to disk, prior to operation of the storage system, and/or set via a configuration parameter prior to, or during, operation of the storage system. That is, the storage system may be pre-configured to include one or more blocks of special data. In some embodiments, a single instance of the special data is pre-allocated on disk. When a request to write data matching the special data is received, the storage system does not write the received data to disk. Instead, the received data is assigned a special pointer that identifies the location on disk at which the special data was pre-allocated. In some embodiments, the storage manager maintains a data structure or other mapping of specially allocated data blocks and their corresponding special pointers. When a request to read specially allocated data is received, the storage system recognizes the special pointer as corresponding to specially allocated data and, instead of issuing a request to read the data from disk, the storage system reads the data from memory (e.g., RAM).

By accessing special data in memory (e.g., RAM) of the storage system, requests for such data can be responded to substantially faster because the special data may be read without accessing the disk. Moreover, by not issuing write requests to store special data on disk, the technology introduced herein avoids disk fragmentation caused by freeing duplicate data blocks. Also, by not issuing write requests to store special data on disk, the technology introduced herein substantially reduces the processing time and overhead associated with deduplicating duplicate data blocks. In addition, by not issuing requests to access special data exceeding a pre-defined sharing threshold on disk, the technology introduced herein eliminates hot spots associated with reading a single instance of a deduplicated data block.

The technology introduced herein can be implemented in accordance with a variety of storage architectures including, but not limited to, a network attached storage (NAS) configuration, a storage area network (SAN) configuration, a multi-protocol storage system, or a disk assembly directly attached to a client or host computer (referred to as a direct attached storage (DAS)), for example. The storage system may include one or more storage devices, and information stored on the storage devices may include structured, semi-structured, and unstructured data. The storage system includes a storage operating system that implements a storage manager, such as a file system, which provides a structuring of data and metadata that enables reading/writing of data on the storage devices of the storage system. It is noted that the term "file system" as used herein does not imply that the data must be in the form of "files" per se.

Each file maintained by the storage system is represented by a tree structure of data and metadata, the root of which is an inode. Each file has an inode within an inode file (or container, in embodiments in which the storage system supports flexible volumes), and each file is represented by one or more indirect blocks. The inode of a file is a metadata container that includes various items of information about that file, including the file size, ownership, last modified time/date, and the location of each indirect block of the file. Each indirect block includes a number of entries. Each entry in an indirect block contains a volume block number (VBN) (or physical volume block number (PVBN)/virtual volume block number (VVBN) pair, in embodiments in which the storage system supports flexible volumes), and each entry can be located using a file block number (FBN) given in a data access request. The FBNs are index values which represent sequentially all of the blocks that make up the data represented by an indirect block. An FBN represents the logical position of the block within a file. Each VBN is a pointer to the physical location at which the corresponding FBN is stored on disk. In embodiments in which the storage system supports flexible volumes, a VVBN identifies an FBN location within the file and the file system uses the indirect blocks of the container file to translate the FBN into a PVBN location within a physical volume.

When a write request (e.g., block access or file access) is received by the storage system, the data is saved temporarily as a number of fixed size blocks in a buffer cache (e.g., RAM). At some later point, the data blocks are written to disk or other non-volatile mass storage device, for example, during an event called a "consistency point." In some embodiments, prior to the data blocks being written to disk, the technology introduced herein examines the contents of each queued data block to determine whether the contents of the data block correspond to special data. When the contents of a data block correspond to data that has been previously identified as special data (e.g., a zero-filled data), a special VBN pointer (or VVBN/PVBN pair) is assigned to the corresponding indirect block of the file to signify that the data is specially allocated. That is, in response to a write request, the storage system determines whether the file (or block) includes specially allocated data and, if so, the storage system assigns a corresponding special pointer value to the indirect blocks of the file to identify the locations of the data that have been pre-allocated on disk. For example, if a data block corresponds to a special, zero-filled block, the corresponding VBN pointer in the level 1 indirect block may be assigned a special VBN (e.g., VBN=0), thereby signifying that the zero-filled data block is specially allocated on disk. As introduced herein, data blocks containing special data are removed from the buffer cache so that they are not written to disk. By not issuing write requests to store special data on disk, the technology introduced herein avoids disk fragmentation caused by freeing duplicate data blocks. Also, by not issuing write requests to store special data on disk, the technology introduced herein substantially reduces the processing time and overhead associated with deduplicating duplicate data blocks.

In some embodiments described herein, one or more of VBN pointers are defined, each signifying that a data block referenced by the pointer contains special data that is specially allocated on disk. For example, the storage system may define a special VBN pointer labeled VBN_ZERO, which signifies that any data block referenced by the pointer is zero-filled and that the zero-filled data is pre-allocated on disk. As another example, the storage system may define a special VBN pointer (or PVBN/VBN pair) labeled VBN_HEADER, which signifies any block whose contents correspond to a particular document header type and that the contents of the particular document header are pre-allocated on disk. When a read request is received by the storage system, the storage system determines whether the corresponding block pointer to the file (or block) matches a special pointer (e.g., VBN_ZERO) and, if so, the storage system reads the specially allocated data block from memory (rather than retrieving the data from disk). By accessing special data in memory (e.g., RAM) of the storage system, requests for such data can be responded to substantially faster because the special data may be read without accessing the disk. In addition, by not issuing requests to access special data exceeding a pre-defined sharing threshold on disk, the technology introduced herein eliminates hot spots associated with reading a single instance of a deduplicated data block.

Before considering the technology introduced herein in greater detail, it is useful to consider an environment in which the technology can be implemented. FIG. 1 is a data flow diagram that illustrates various components or services that are part of a storage network. A storage server 100 is connected to a non-volatile storage subsystem 110 which includes multiple mass storage devices 120, and to a number of clients 130 through a network 140, such as the Internet or a local area network (LAN). The storage server 100 may be a file server used in a NAS mode, a block-based server such as used in a storage area network (SAN), or a server that can operate in both NAS and SAN modes. The storage server 100 provides storage services relating to the organization of information on storage devices (e.g., disks) 120 of the storage subsystem 110.

The clients 130 may be, for example, a personal computer (PC), workstation, server, etc. A client 130 may request the services of the storage server 100, and the system may return the results of the services requested by the client 130 by exchanging packets of information over the network 140. The client 130 may issue a request using a file-based access protocol, such as the Common Internet File System (CIFS) protocol or Network File System (NFS) protocol, over TCP/IP when accessing information in the form of files and directories. Alternatively, the client may issue a request using a block-based access protocol, such as the Small Computer Systems Interface (SCSI) protocol encapsulated over TCP (iSCSI) and SCSI encapsulated over Fibre Channel (FCP), when accessing information in the form of blocks.

The storage subsystem 110 is managed by the storage server 100. The storage server 100 receives and responds to various transaction requests (e.g., read, write, etc.) from the clients 130 directed to data stored or to be stored in the storage subsystem 110. The mass storage devices 120 in the storage subsystem 110 may be, for example, magnetic disks, optical disks such as CD-ROM or DVD based storage, magneto-optical (MO) storage, or any other type of non-volatile storage devices suitable for storing large quantities of data. Such data storage on the storage subsystem may be implemented as one or more storage volumes that comprise a collection of physical storage devices (e.g., disks) 120 cooperating to define an overall logical arrangement of volume block number ("VBN") space on the volumes. Each logical volume is generally, although not necessarily, associated with a single file system. The storage devices 120 within a volume are may be organized as one or more groups, and each group can be organized as a Redundant Array of Inexpensive Disks (RAID), in which case the storage server 100 accesses the storage subsystem 110 using one or more well-known RAID protocols. However, other implementations and/or protocols may be used to organize the storage devices 120 of storage subsystem 110.

In some embodiments, the technology introduced herein is implemented in the storage server 100 or in other devices. For example, the technology can be adapted for use in other types of storage systems that provide clients with access to stored data or processing systems other than storage servers. While various embodiments are described in terms of the environment described above, those skilled in the art will appreciate that the technology may be implemented in a variety of other environments including a single, monolithic computer system, as well as various other combinations of computer systems or similar devices connected in various ways. For example, in some embodiments, the storage server 100 has a distributed architecture, even though it is not illustrated as such in FIG. 1.

Figure 2:
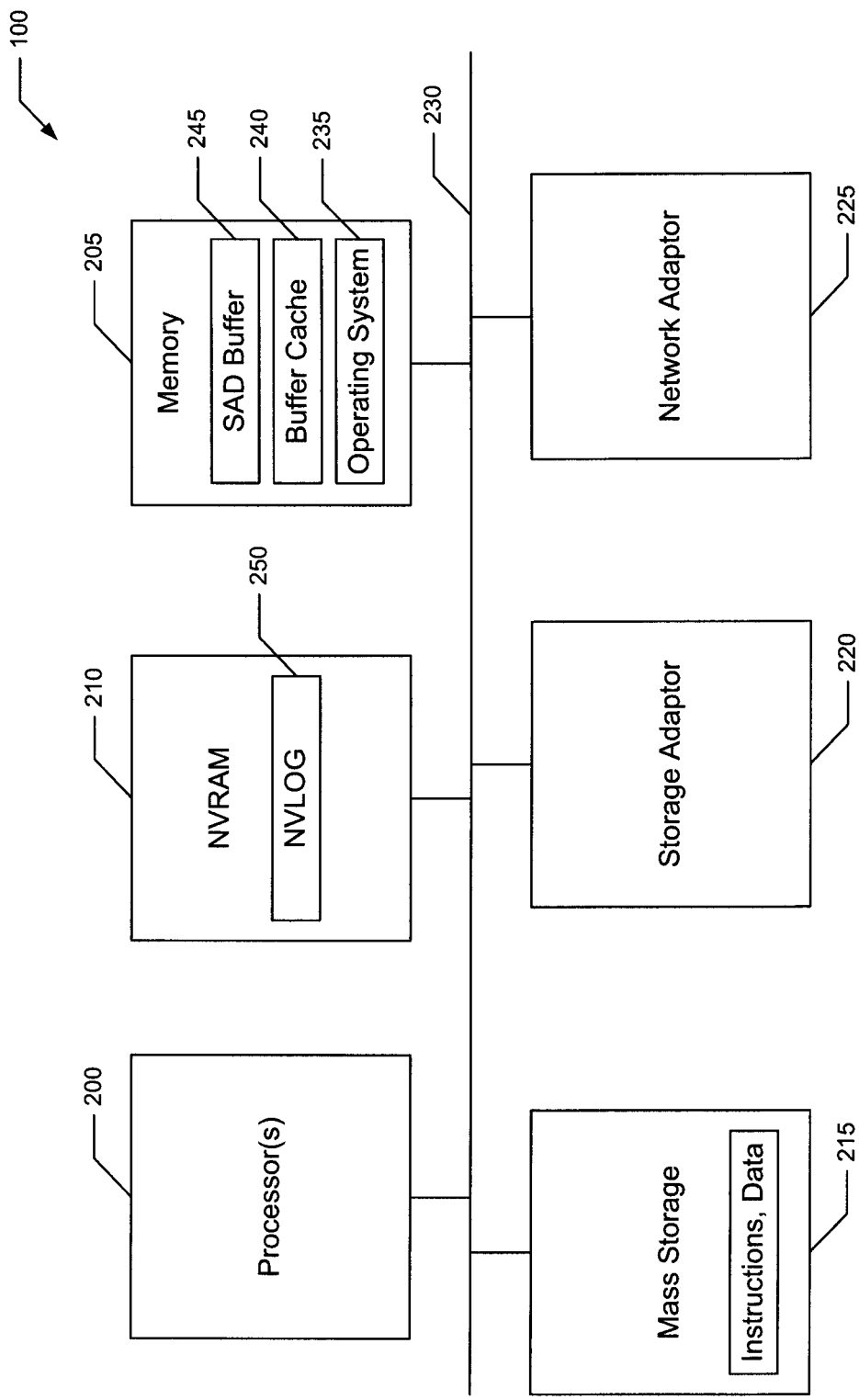
FIG. 2 is a high-level block diagram of a storage system, in one embodiment.

FIG. 2 is a high-level block diagram showing an example architecture of the storage server 100. Certain well-known structures and functions which are not germane to this description have not been shown or described. The storage server 100 includes one or more processors 200, a memory 205, a non-volatile random access memory (NVRAM) 210, one or more internal mass storage devices 215, a storage adapter 220, and a network adapter 225 couple to an interconnect system 230. The interconnect system 230 shown in FIG. 2 is an abstraction that represents any one or more separate physical buses and/or point-to-point connections, connected by appropriate bridges, adapters and/or controllers. The interconnect system 230, therefore, may include, for example, a system bus, a form of Peripheral Component Interconnect (PCI) family bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 200 are the central processing units (CPUs) of the storage server 100 and, thus, control its overall operation. In some embodiments, the processors 200 accomplish this by executing software stored in memory 205. A processor 210 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 205 includes the main memory of the storage server 100. Memory 205 represents any form of random access memory (RAM), read-only memory (ROM), flash memory, or the like, or a combination of such devices. Memory 205 stores (among other things) the storage operating system 235. The storage operating system 235 implements a storage manager, such as a file system manager, to logically organize the information as a hierarchical structure of directories, files, and special types of files called virtual disks on the disks. A portion of the memory 205 is organized as a buffer cache 240 for temporarily storing data associated with requests issued by clients 130 that are, during the course of a consistency point, flushed (written) to disk or another non-volatile storage device. The buffer cache includes a plurality of storage locations or buffers organized as a buffer tree structure. A buffer tree structure is an internal representation of loaded blocks of data for, e.g., a file or virtual disk (vdisk) in the buffer cache 240 and maintained by the storage operating system 235. In some embodiments, a portion of the memory 205 is organized as a "specially allocated data" (SAD) data structure 245 for storing single instances of data that are to be, or have been, specially allocated by the storage server 100.

The non-volatile RAM (NVRAM) 210 is used to store changes to the file system between consistency points. Such changes may be stored in a non-volatile log (NVLOG) 250 that is used in the event of a failure to recover data that would otherwise be lost. In the event of a failure, the NVLOG is used to reconstruct the current state of stored data just prior to the failure. In some embodiments, the NVLOG 250 includes a separate entry for each write request received from a client 130 since the last consistency point. In some embodiments, the NVLOG 250 includes a log header followed by a number of entries, each entry representing a separate write request from a client 130. Each request may include an entry header followed by a data field containing the data associated with the request (if any), e.g., the data to be written to the storage subsystem 110. The log header may include an entry count, a CP (consistency point) count, and other metadata. The entry count indicates the number of entries currently in the NVLOG 250. The CP count identifies the last consistency point to be completed. After each consistency point is completed, the NVLOG 250 is cleared and started anew. The size of the NVRAM is variable. However, it is typically sized sufficiently to log a certain time-based chunk of requests from clients 130 (for example, several seconds worth).

Also connected to the processors 200 through the interconnect system 230 are one or more internal mass storage devices 215, a storage adapter 220 and a network adapter 225. Internal mass storage devices 215 may be or include any computer-readable storage medium for storing data, such as one or more disks. As used herein, the term "disk" refers to any computer-readable storage medium including volatile (e.g., RAM), nonvolatile (e.g., ROM, Flash, etc.), removable, and non-removable media, or any combination of such media devices that are capable of storing information such as computer-readable instructions, data structures, program modules, or other data. It is further noted that the term "disk" may refer to physical or virtualized computer-readable storage media. The storage adapter 220 allows the storage server 100 to access the storage subsystem 110 and may be, for example, a Fibre Channel adapter or a SCSI adapter. The network adapter 225 provides the storage server 100 with the ability to communicate with remote devices, such as the clients 130, over a network and may be, for example, an Ethernet adapter, a Fibre Channel adapter, or the like.

Figure 3:
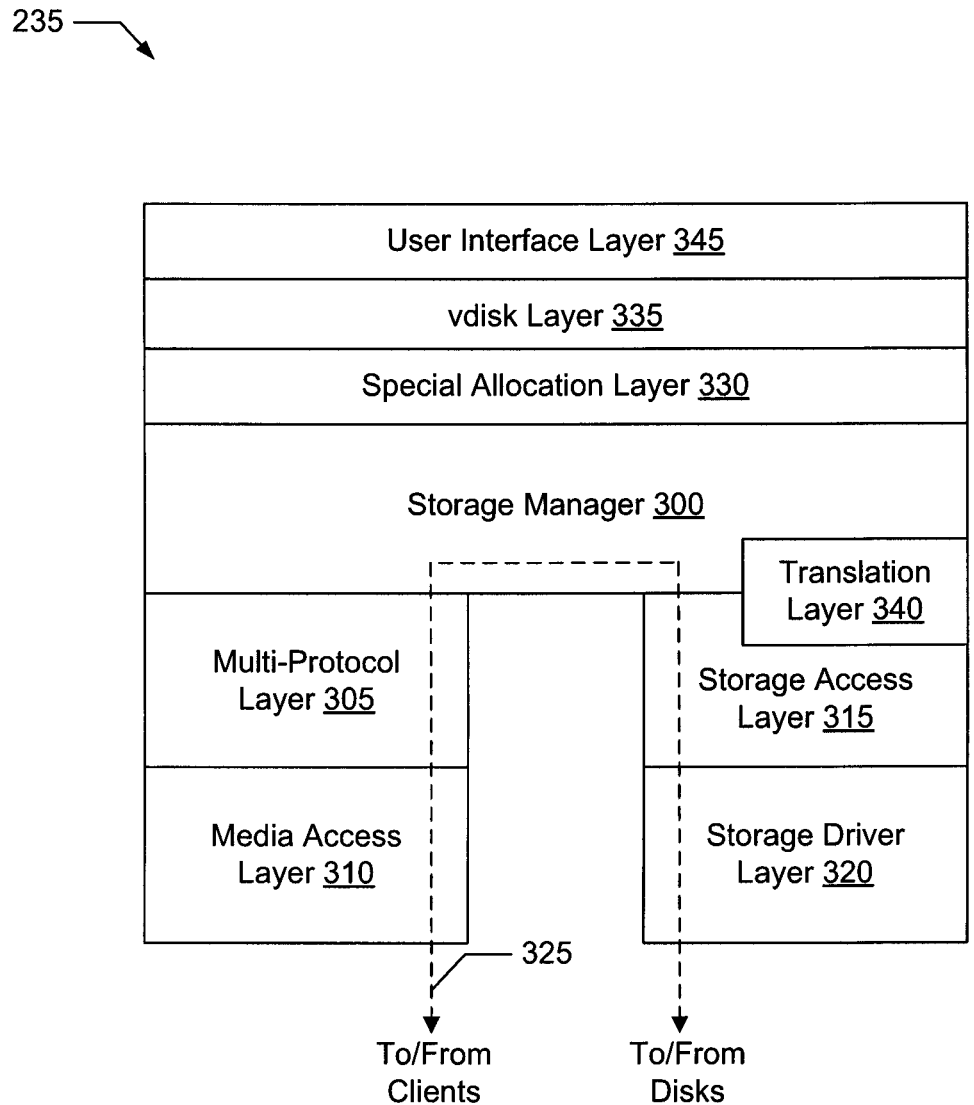
FIG. 3 is a high-level block diagram showing an example of a storage operating system, in one embodiment.

FIG. 3 shows an example of the architecture of the storage operating system 235 of the storage server 100. As shown, the storage operating system 235 includes several software modules or "layers." These layers include a storage manager 300. The storage manager layer 300 is application-layer software that services data access requests from clients 130 and imposes a structure (e.g., hierarchy) on the data stored in the storage subsystem 110 and storage devices 215.

In some embodiments, storage manager 300 implements a write in-place file system algorithm, while in other embodiments the storage manager 300 implements a write-anywhere file system. In a write in-place file system, the locations of the data structures, such as inodes and data blocks, on disk are typically fixed and changes to such data structures are made "in-place." In a write-anywhere file system, when a block of data is modified, the data block is stored (written) to a new location on disk to optimize write performance (sometimes referred to as "copy-on-write"). A particular example of a write-anywhere file system is the Write Anywhere File Layout (WAFL®) file system available from NetApp, Inc. of Sunnyvale, Calif. The WAFL® file system is implemented within a microkernel as part of the overall protocol stack of a storage server and associated storage devices, such as disks. This microkernel is supplied as part of Network Appliance's Data ONTAP® software. It is noted that the technology introduced herein does not depend on the file system algorithm implemented by the storage manager 300.

Logically "under" the storage manager layer 300, the storage operating system 235 also includes a multi-protocol layer 305 and an associated media access layer 310, to allow the storage server 100 to communicate over the network 140 (e.g., with clients 130). The multi-protocol layer 305 implements various higher-level network protocols, such as Network File System (NFS), Common Internet File System (CIFS), Direct Access File System (DAFS), Hypertext Transfer Protocol (HTTP) and/or Transmission Control Protocol/Internet Protocol (TCP/IP). The media access layer 310 includes one or more drivers which implement one or more lower-level protocols to communicate over the network, such as Ethernet, Fibre Channel or Internet small computer system interface (iSCSI).

Also logically "under" the storage manager layer 300, the storage operating system 235 includes a storage access layer 315 and an associated storage driver layer 320, to allow the storage server 100 to communicate with the storage subsystem 110. The storage access layer 315 implements a higher-level disk storage protocol, such as RAID, while the storage driver layer 320 implements a lower-level storage device access protocol, such as Fibre Channel Protocol (FCP) or small computer system interface (SCSI). Also shown in FIG. 3 is a path 325 of data flow, through the storage operating system 235, associated with a request.

In some embodiments, the storage operating system 235 includes a special allocation layer 330 logically "above" the storage manager 300. The special allocation layer 330 is an application layer that examines the contents of data blocks included in the NVLOG 250 to determine whether the contents correspond to specially allocated data. For example, specially allocated data may include zero-filled data blocks, data blocks whose contents correspond to a particular document header type, data blocks exceeding a pre-defined sharing threshold, or other designated data. In yet another embodiment, the special allocation layer 330 is included in the storage manager 300. Note, however, that the special allocation layer 330 does not have to be implemented by the storage server 100. For example, in some embodiments, the special allocation layer 330 is implemented in a separate system to which the NVLOG 250, buffer cache 240, or data blocks are provided as input.

In operation, a write request issued by a client 130 is forwarded over the network 140 and onto the storage server 100. A network driver (of layer 310) processes the write request and, if appropriate, passes the request on to the multi-protocol layer 305 for additional processing (e.g., translation to an internal protocol) prior to forwarding to the storage manager 300. The write request is then temporarily stored (queued) by the storage manager 300 in the NVLOG 250 of the NVRAM 210 and temporarily stored in the buffer cache 240. In some embodiments, the special allocation layer 330 examines the contents of queued write requests (data blocks) to determine whether the contents correspond to specially allocated data. When the contents of a data block corresponds to data that has been previously identified as special data, a special VBN (or VVBN/PVBN pair) is assigned to the corresponding level 1 block pointer in the buffer tree that contains the block and the data block is removed from the buffer cache 240 so that it is not flushed to disk. For example, a special VBN labeled VBN_ZERO may be assigned to a level 1 block pointer to signify that the data for the corresponding level 0 block is zero-filled and has been pre-allocated on disk. By not issuing write requests to store special data on disk, the technology introduced herein avoids disk fragmentation caused by freeing duplicate data blocks. Also, by not issuing write requests to store special data on disk, the technology introduced herein substantially reduces the processing time and overhead associated with deduplicating duplicate data blocks.

Subsequently, if a read request is received, the storage manager 300 indexes into the inode of the file using a file block number (FBN) given in the request to access an appropriate entry and retrieve a volume block number (VBN). If a retrieved VBN corresponds to a special VBN (e.g., VBN_ZERO), the storage manager 300 reads the specially allocated data from memory (e.g., from the SAD data structure 245). Otherwise, the storage manager 300 generates operations to read the requested data from disk 120, unless the data is present in the buffer cache 240. If the data is in the buffer cache 240, the storage manager reads the data from buffer cache 240. Otherwise, if the data is not in the buffer cache 240, the storage manager 300 passes a message structure including the VBN to the storage access layer 315 to map the VBN to a disk identifier and disk block number (disk, DBN), which are then sent to an appropriate driver (e.g., SCSI) of the storage driver layer 320. The storage driver accesses the DBN from the specified disk 120 and loads the requested data blocks into buffer cache 240 for processing by the storage manager 300. By accessing special data in memory 205 of the storage server 100, requests for such data can be responded to substantially faster because the special data may be read without accessing the disk and/or the storage subsystem 110. In addition, by not issuing requests to access special data exceeding a pre-defined sharing threshold on disk, the technology introduced herein eliminates hot spots associated with reading a single instance of a deduplicated data block.

Figure 4:
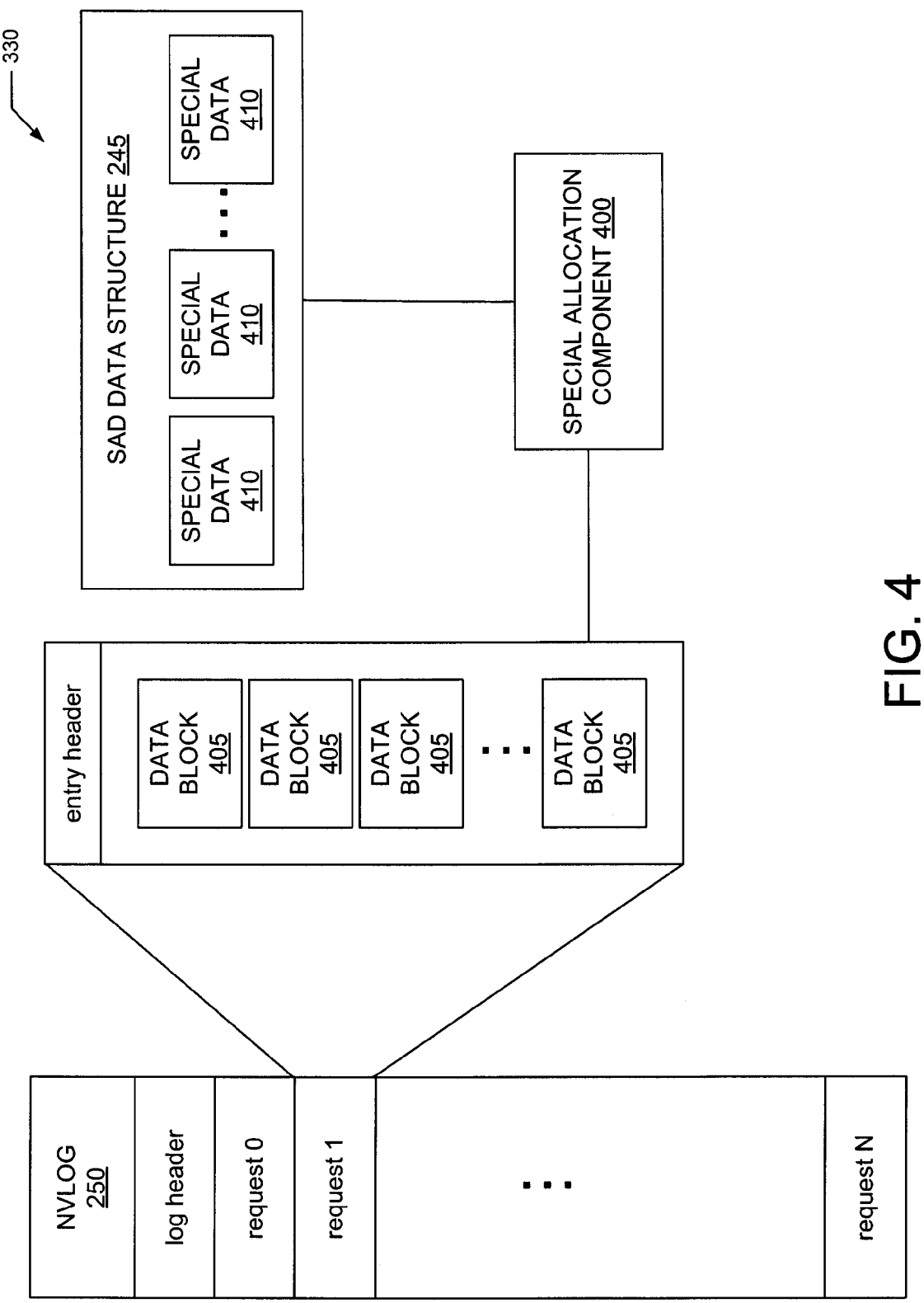
FIG. 4 illustrates functional elements of a special allocation layer, in one embodiment.

FIG. 4 illustrates the relevant functional elements of the special allocation layer 330 of the storage operating system 235, according to one embodiment. It is noted that the special allocation layer may operate on any data that is pre-allocated on storage devices 120 and/or 215 of storage system 100. However, to facilitate description herein, it is assumed that the special allocation layer operates on data that is pre-allocated on storage devices 120. The special allocation layer 330 (shown in FIG. 4) includes a special allocation component 400. The special allocation component 400 examines the contents of data blocks 405 included in NVLOG 250 to determine whether the contents correspond to data that has been previously identified as special data, such as specially allocated data 410 included in the SAD data structure 245. For example, the allocation component 400 may compare the contents of a data block 405 to the specially allocated (e.g., zero-filled) data 410. As another example, the special allocation component 400 may compute a hash of a data block 405 and compare the hash to a hash of the specially allocated data 410. When the contents of a data block 405 correspond to specially allocated data 410, the special allocation component 400 removes the data block 405 from the buffer cache 240 and assigns a special pointer to the corresponding level 1 block pointer to signify that the data block 405 contains specially allocated data 410 that is pre-allocated on disk 120.

In some embodiments, the special allocation component 400 processes the NVLOG 250 prior to the data blocks being written to disk 120. This may occur, for example, during an event called a "consistency point", in which the storage server 100 stores new or modified data to its mass storage devices 120 based on the write requests temporarily stored in the buffer cache 240. However, it is noted that, in some embodiments, a consistency point may begin before the special allocation component 400 finishes examining all of the data block 410 of NVLOG 250. In such cases, the data blocks 410, which have not yet been examined, are examined during the consistency point and before the consistency point completes. That is, each unexamined data block is examined before being flushed to disk.

In some embodiments, the special allocation component 400 is embodied as one or more software modules within the special allocation layer 330 of the storage operating system 235. In other embodiments, however, the functionality provided by the special allocation component is implemented, at least in part, by one or more dedicated hardware circuits. The special allocation component 400 may be stored or distributed on, for example, computer-readable media, including magnetically or optically readable computer discs, hard-wired or preprogrammed chips (e.g., EEPROM semiconductor chips), nanotechnology memory, or other computer-readable storage medium. Indeed, computer implemented instructions, data structures, screen displays, and other data under aspects of the technology described herein may be distributed over the Internet or over other networks (including wireless networks), on a propagated signal on a propagation medium (e.g., an electromagnetic wave(s), etc.) over a period of time, or they may be provided on any analog or digital network (packet switched, circuit switched, or other scheme).

Returning to FIG. 3, in some embodiments, the storage manager 300 cooperates with virtualization layers (e.g., vdisk layer 335 and translation layer 340) to "virtualize" the storage space provided by storage devices 120. That is, the storage manager 300, together with the vdisk layer 335 and the translation layer 340, aggregates the storage devices 120 of storage subsystem 110 into a pool of blocks that can be dynamically allocated to form a virtual disk (vdisk). A vdisk is a special file type in a volume that has associated export controls and operation restrictions that support emulation of a disk. The vdisk includes a special file inode that functions as a container for storing metadata associated with the emulated disk. It should be noted that the storage manager 300, the vdisk layer 335, and translation layer 340 can be implemented in software, hardware, firmware, or a combination thereof.

The vdisk layer 335 is layered on the storage manager 300 to enable access by administrative interfaces, such as user interface (UI) 345, in response to a user (e.g., a system administrator) issuing commands to the storage server 100. The vdisk layer 335 implements a set of vdisk (LUN) commands issued through the UI 345 by a user. These vdisk commands are converted to file system operations that interact with the storage manager 300 and the translation layer 340 to implement the vdisks.

The translation layer 340, in turn, initiates emulation of a disk or LUN by providing a mapping procedure that translates LUNs into the special vdisk file types. The translation layer 340 is logically "between" the storage access layer 315 and the storage manager 300 to provide translation between the block (LUN) space and the file system space, where LUNs are represented as blocks. In some embodiments, the translation layer 340 provides a set of application programming interfaces (APIs) that are based on the SCSI protocol and that enable a consistent interface to both the iSCSI and FCP drivers. In operation, the translation layer 340 may transpose a SCSI request into a message representing an operation directed to the storage manager 300. A message generated by the translation layer 340 may include, for example, a type of operation (e.g., read, write) along with a pathname and a filename of the vdisk object represented in the file system. The translation layer 340 passes the message to the storage manager 300 where the operation is performed.

Figure 5:
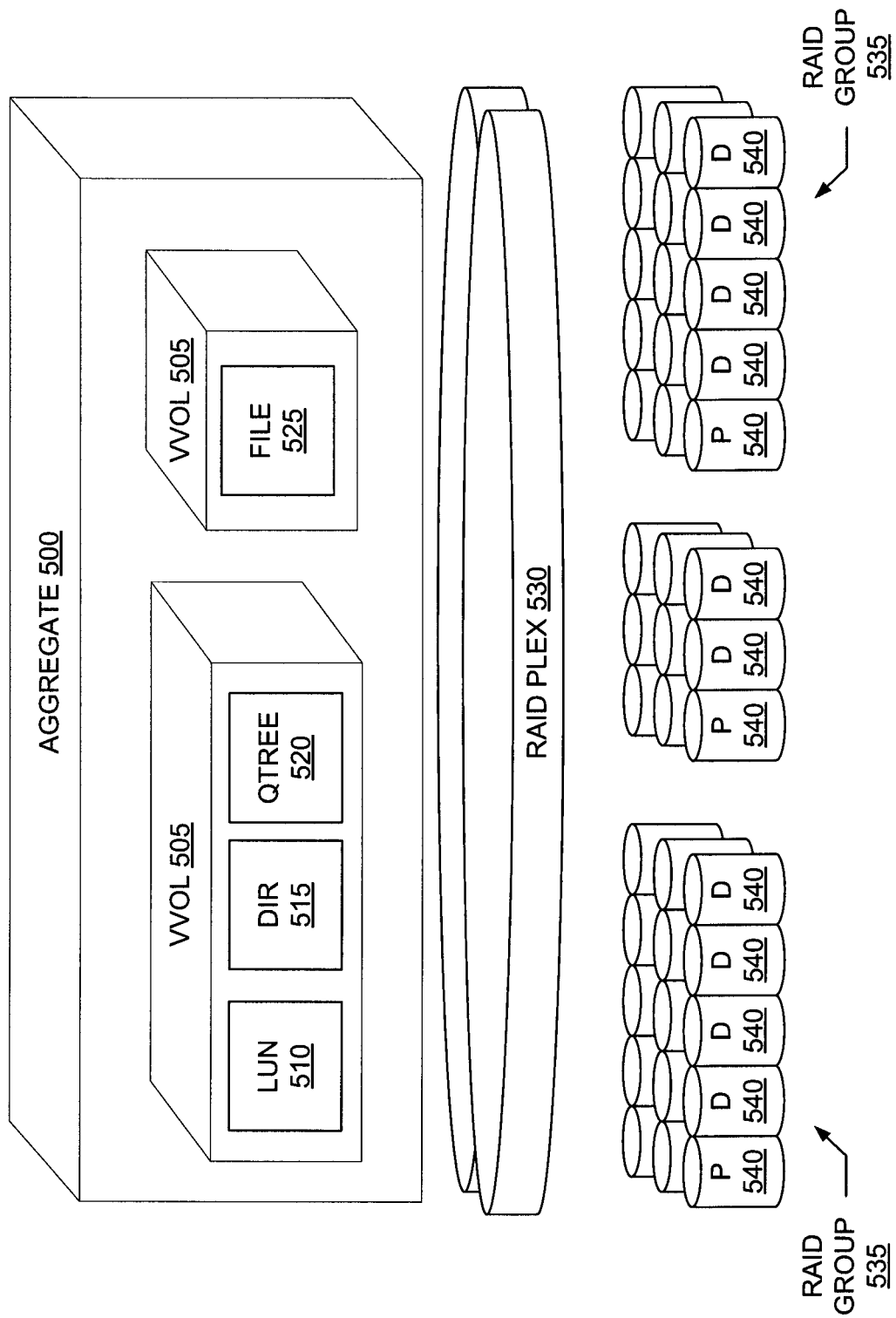
FIG. 5 illustrates an aggregate, in one embodiment.

In some embodiments, the storage manager 300 implements so called "flexible" volumes (hereinafter referred to as virtual volumes (VVOLs)), where the file system layout flexibly allocates an underlying physical volume into one or more VVOLs. FIG. 5 illustrates an aggregate 500, in one embodiment. As used herein, the underlying physical volume for a plurality of VVOLs 505 is an aggregate 500 of one or more groups of disks of a storage system.

As illustrated in FIG. 5, each VVOL 505 can include named logical unit numbers (LUNs) 510, directories 515, qtrees 520, and files 525. A qtree 520 is a special type of directory that acts as a "soft" partition, i.e., the storage used by the qtrees is not limited by space boundaries. The aggregate 500 is layered on top of the translation layer 340, which is represented by at least one RAID plex 530, wherein each plex 530 includes at least one RAID group 535. Each RAID group further includes a plurality of disks 540, e.g., one or more data (D) disks and at least one (P) parity disk.

Whereas the aggregate 500 is analogous to a physical volume of a conventional storage system, a VVOL 505 is analogous to a file within that physical volume. That is, the aggregate 500 may include one or more files, wherein each file contains a VVOL 505 and wherein the sum of the storage space consumed by flexible volumes associated with the aggregate 500 is physically less than or equal to the size of the overall physical volume. The aggregate 500 utilizes a physical volume block number (PVBN) space that defines the storage space of blocks provided by the disks of the physical volume, while each VVOL embedded within a file utilizes a "logical" or "virtual" volume block number (VVBN) space in order to organize those blocks as files. The PVBNs reference locations on disks of the aggregate 500, whereas the VVBNs reference locations within files of the VVOL 505. Each VVBN space is an independent set of numbers that corresponds to locations within the file that may be translated to disk block numbers (DBNs) on disks 120. Since a VVOL 505 is also a logical volume, it has its own block allocation structures (e.g., active, space and summary maps) in its VVBN space.

Each VVOL 505 may be a separate file system that is "mingled" onto a common set of storage in the aggregate 500 by an associated storage operating system 235. In some embodiments, the translation layer 335 of the storage operating system 235 builds a RAID topology structure for the aggregate 500 that guides each file system when performing write allocations. The translation layer 335 also presents a PVBN to disk block number (DBN) mapping to the storage manager.

Figure 6:
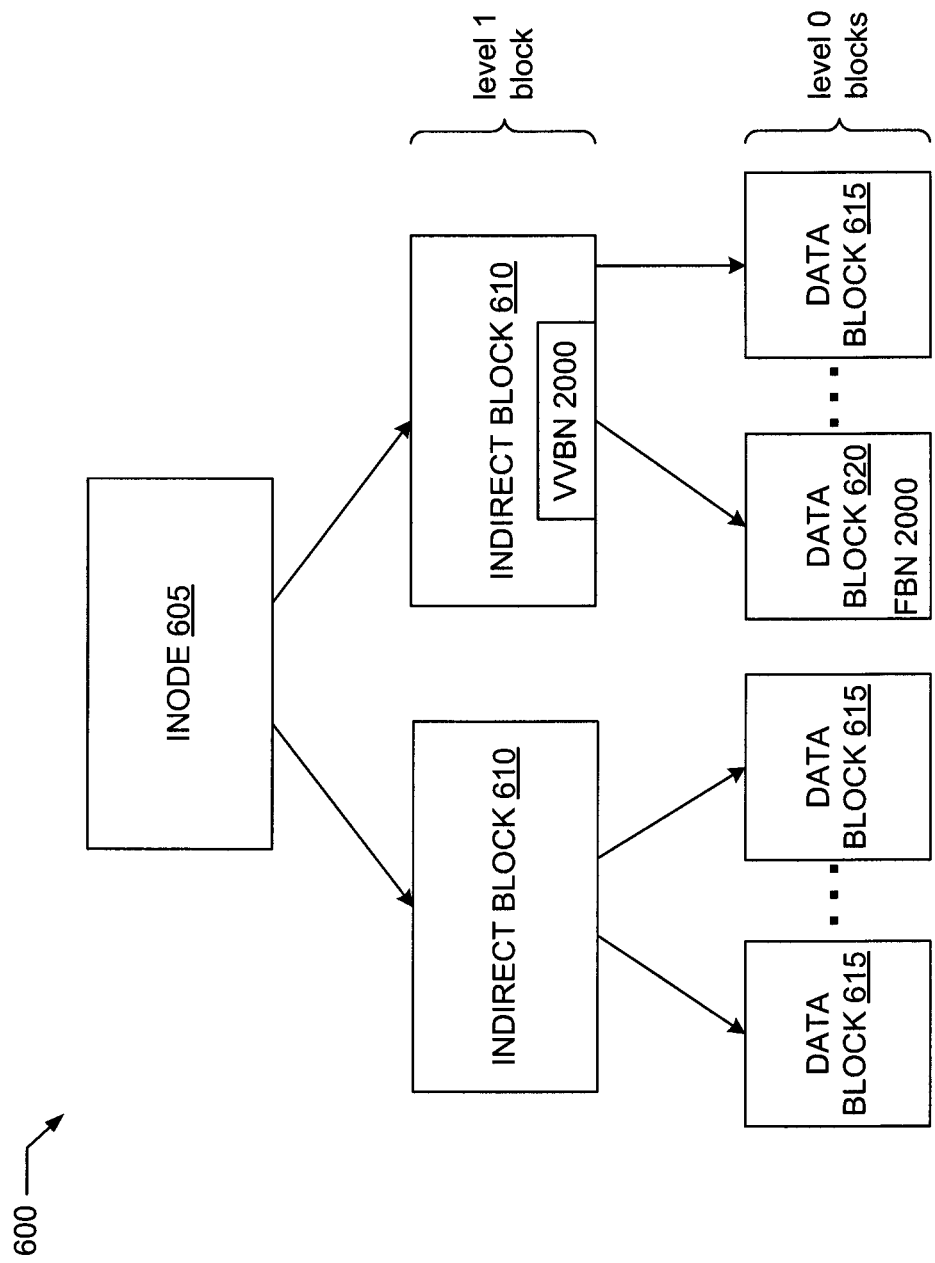
FIG. 6 is a high-level block diagram of a container file for a flexible volume, in one embodiment.

A container file may be associated with each VVOL 505. As used herein, a container file is a file in the aggregate 500 that contains all blocks of the VVOL 505. In some embodiments, the aggregate 500 includes one container file per VVOL 505. FIG. 6 is a block diagram of a container file 600 for a VVOL 505. The container file 600 has an inode 605 of the flexible volume type that is assigned an inode number equal to a virtual volume id (VVID). The container file 600 is typically one large, sparse virtual disk and, since it contains all blocks owned by its VVOL. It is noted that a block with VVBN of "x" in the VVOL 505 can be found at the file block number (FBN) of "x" in the container file 600. For example, VVBN 2000 in the VVOL 505 can be found at FBN 2000 in its container file 600. Since each VVOL 505 in the aggregate 500 has its own distinct VVBN space, another container file may have FBN 2000 that is different from FBN 2000 in the container file 600. The inode 605 references indirect blocks 610, which, in turn, reference both physical data blocks 615 and virtual data blocks 620 at level 0.

Figure 7:
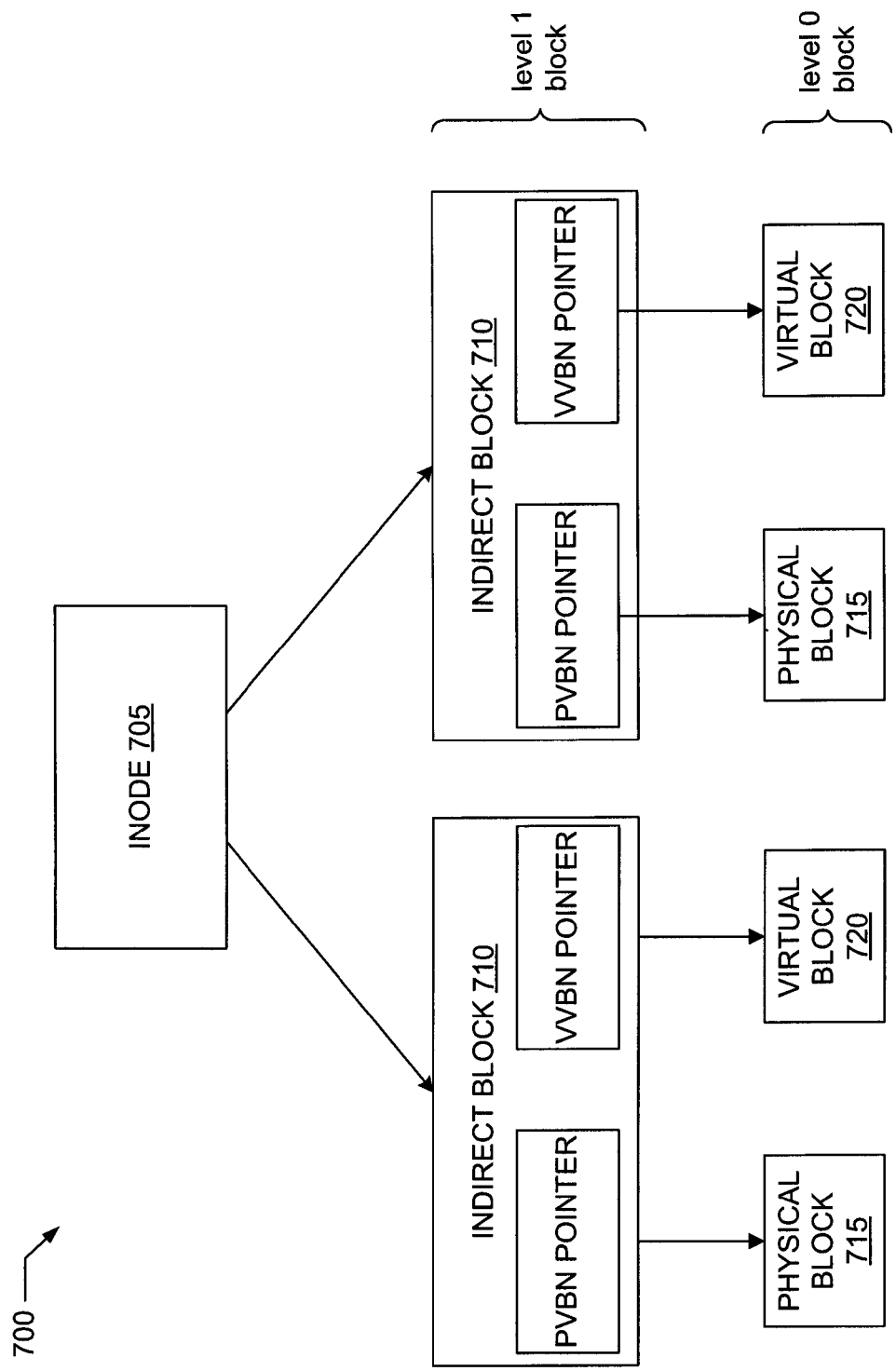
FIG. 7 is a high-level block diagram of a file within a container file, in one embodiment.

FIG. 7 is a block diagram of a buffer tree of a file 700 within the container file 600. The file 700 is assigned an inode 705, which references indirect blocks 710. The buffer tree is an internal representation of blocks of file 700 loaded into the buffer cache 240 maintained by the storage operating system 235. It is noted that there may be additional levels of indirect blocks 710 (e.g., level 2, level 3) depending upon the size of the file 700. In a file within a flexible volume, an indirect block 710 stores references to both the physical VBN (PVBN) and the virtual VBN (VVBN). The PVBN references a physical block 715 in the aggregate 500 and the VVBN references a logical block 720 in the VVOL 505. FIG. 7 shows the indirect blocks 710 referencing both physical data blocks 715 and virtual data blocks 720 at level 0. In some embodiments, the special allocation layer 330 supports VVOLs. Thus, in embodiments where VVOLs are supported, the special allocation layer 330 may define one or more special VVBN/PVBN pointer pairs that are used to indicate that the level 0 data blocks associated VVBN/PVBN pairs are specially allocated and pre-allocated on disk. In operation, when the contents of a data block corresponds to data that has been previously identified as special data, a special VVBN/PVBN pair is assigned to the corresponding level 1 block pointer and the data block is removed from the buffer cache 240 so that it is not flushed to disk. Subsequently, when the block is requested, the storage manager 300 identifies the special VVBN/PVBN pair and reads the corresponding specially allocated data block from memory 245 (not disk 120). By accessing special data in memory 205 of the storage server 100, requests for such data can be responded to substantially faster because the special data may be read without accessing the disk and/or the storage subsystem 110. Moreover, by not issuing write requests to store special data on disk, the technology introduced herein avoids disk fragmentation caused by freeing duplicate data blocks. Also, by not issuing write requests to store special data on disk, the technology introduced herein substantially reduces the processing time and overhead associated with deduplicating duplicate data blocks. In addition, by not issuing requests to access special data exceeding a pre-defined sharing threshold on disk, the technology introduced herein eliminates hot spots associated with reading a single instance of a deduplicated data block.

Figure 8:
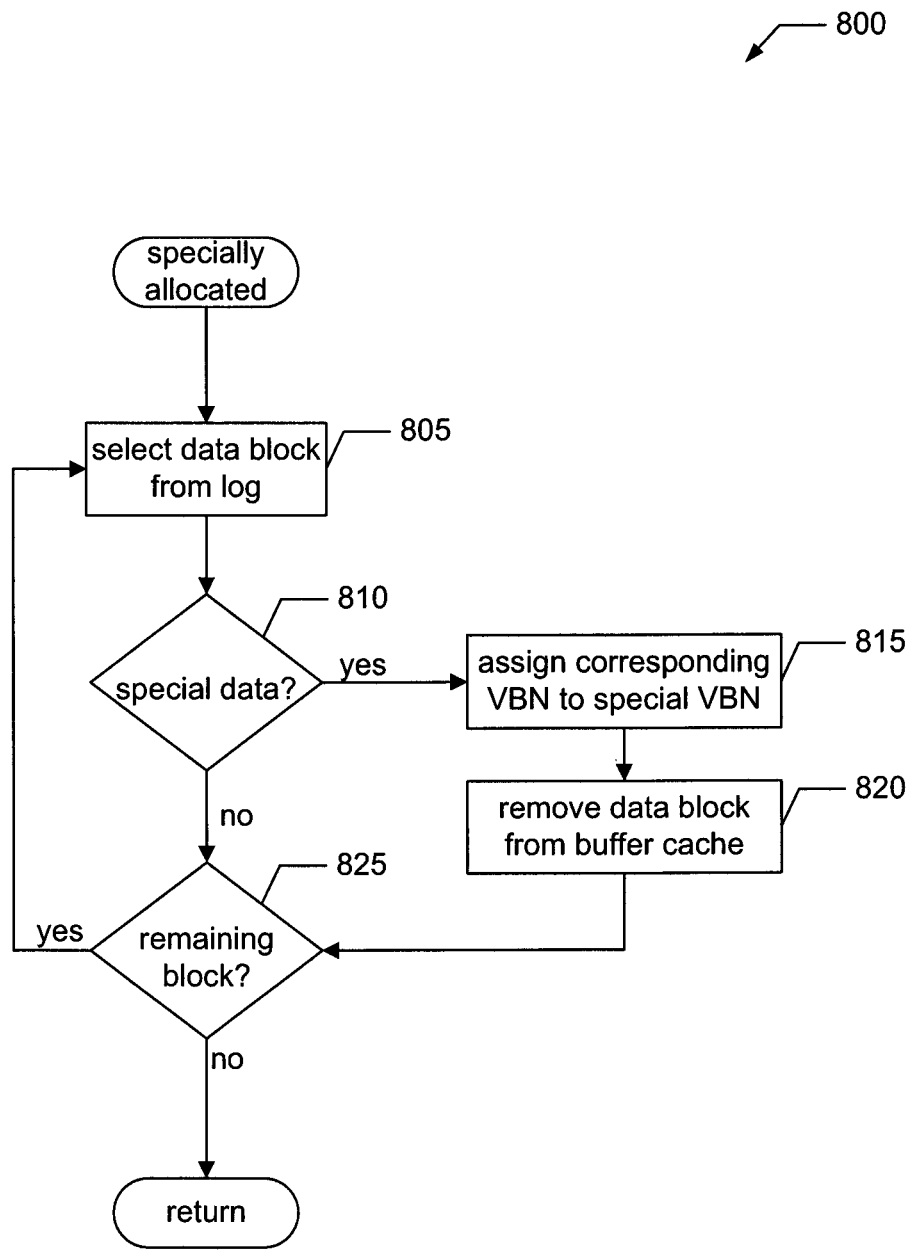
FIG. 8 is a flow chart of a process for specially allocating data blocks prior to the data blocks being written to disk, in one embodiment.

FIG. 8 is a flow chart of a process 800 for specially allocating data blocks prior to the data blocks being written to disk. In some embodiments, the process 800 is performed by special allocation component 400. To facilitate description, it is assumed that the storage server 100 receives a request from a client 130 to write a 10 gigabyte (GB) virtual disk image file to disk (e.g., such a request may be received as a result of a user creating a virtual machine). To facilitate description, it is further assumed that the storage manager 300 operates on data arranged in 4 kilobyte (kb) blocks. Thus, the virtual disk image file received by the storage server 100 is converted from 10 GB to 20,971,520 4-kb blocks. In addition, to facilitate description, it is assumed that a 4 kilobyte (kb), zero-filled data block 410 has been specially allocated by the storage server 100 in memory 245. It is noted that the process 800 may be used to specially allocate other types of data. For example, the process 800 may be employed to specially allocate data blocks whose contents correspond to a particular document header type. As such, the special allocation of zero-filled blocks should not be taken as restrictive.

In some embodiments, the process 800 is invoked in response to an entry associated with a write request being added to the NVLOG 250. While in other embodiments, the process 800 is invoked after a pre-defined number of entries are added to the NVLOG 250. In yet other embodiments, the process 800 is invoked as a precursor to, or as part of, a consistency point.

Initially, at step 805, the special allocation component 400 selects a data block 405 (FIG. 4) from the NVLOG 250. For example, the selected data block may be one of the 20,971,520 4-kb zero-filled data blocks of the virtual disk image file.

Next, at step 810, the special allocation component 400 determines whether the contents of the selected data block 405 correspond to specially allocated data 410. For example, the allocation component 400 may compare the contents of the selected block 405 to the contents of a specially allocated, zero-filled block 410. As another example, the special allocation component 400 may compute a hash of the selected block 405 and compare the hash to a hash of the specially allocated, zero-filled block 410. If the contents of the selected data block 405 do not correspond to specially allocated data 410, the process continues at step 825, as described below. Otherwise, if the contents of the selected data block 405 correspond to specially allocated data 410 (e.g., for zero-filled special data, if the hash is zero), the process proceeds to step 815.

At step 815, the special allocation component 400 assigns a special pointer (e.g., VBN_ZERO) to the corresponding level 1 indirect block of the file to signify that the contents of the data block 405 corresponds to specially allocated data (e.g., is zero-filled) and has been pre-allocated on disk. Then the process proceeds to step 820.

At step 820, the special allocation component 400 removes the selected block 405 from the buffer cache 240 so that the block 405 is not written to disk 120. Then the process proceeds to step 825.

At step 825, the special allocation component 400 determines whether all of the blocks 405 in the NVLOG 250 have been selected for processing. If any block 405 remains, the process continues at step 805 where the special allocation component 400 selects a block 405, as described above. Otherwise, if all of the blocks 405 have been selected, the process ends.

Those skilled in the art will appreciate that the steps shown in FIG. 8 and in each of the following flow diagrams may be altered in a variety of ways. For example, the order of certain steps may be rearranged; certain substeps may be performed in parallel; certain shown steps may be omitted; or other steps may be included; etc.

Figure 9:
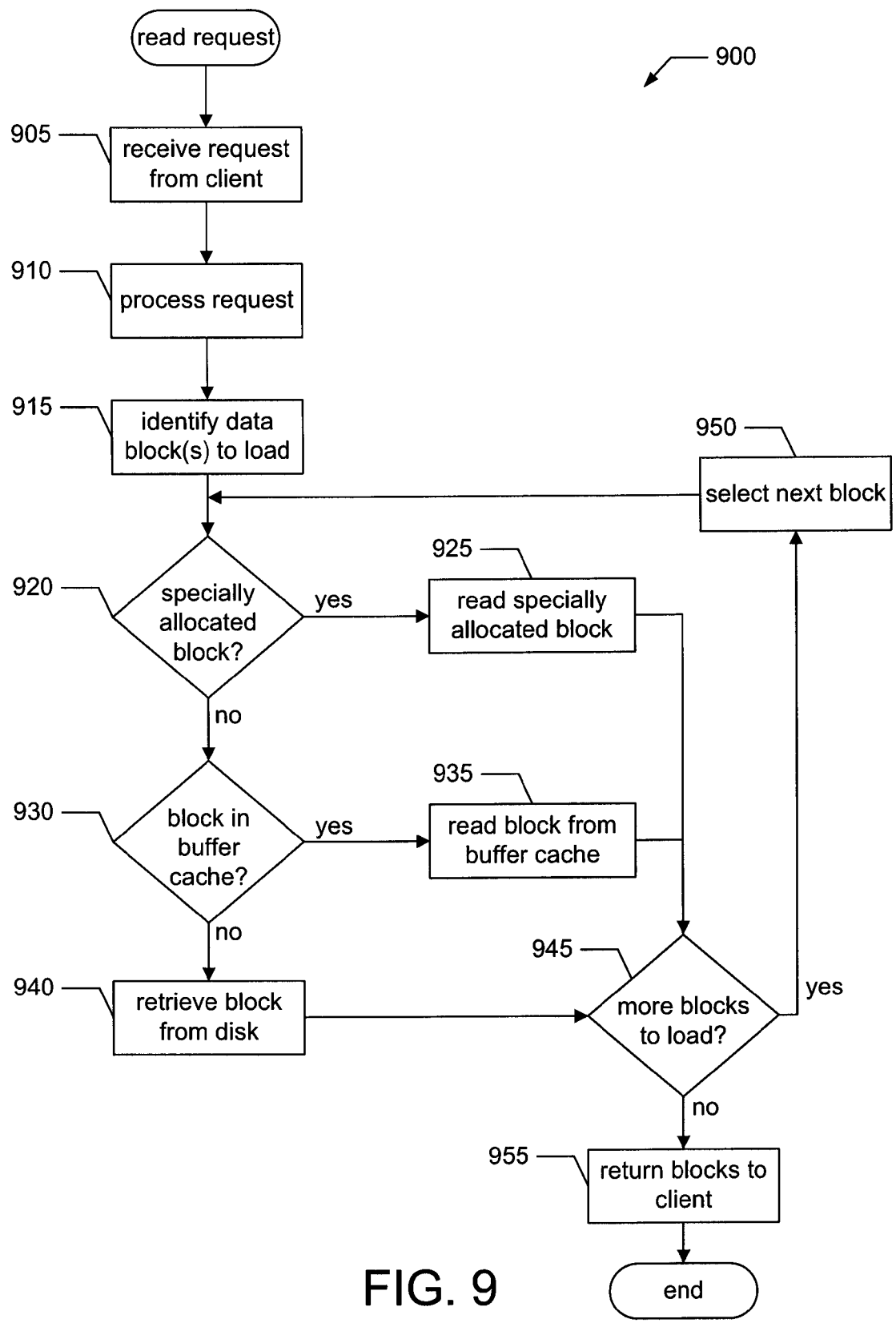
FIG. 9 is a flow chart of a process for servicing a read request, in one embodiment.

FIG. 9 is a flow chart of a process 900 for servicing a read request, in one embodiment. In some embodiments, the process 900 is performed by the storage manager 300. However, it is noted that the process 900 may be used performed by another component of the storage server and/or another computing device. As such, references to the storage manager 300 should not be taken as restrictive.

In some embodiments, the process 900 is invoked in response to the stprage server 100 receiving a read request from a client 130. Initially, the process begins at step 905, when the storage manager 300 receives a read request, such as a file request, a block request, and so on. Next, at step 910, the storage manager 300 processes the request by, for example, converting the request to a set of file system operations. Then, the process proceeds to step 915. At step 915, the storage manager 300 identifies the data blocks to load. This may be accomplished, for example, by identifying the inode corresponding to the request. Then, the process proceeds to step 920.

At step 920, for each identified block, a determination is made as to whether the block is specially allocated. This determination may be made, for example, by examining the corresponding level 1 block pointer referencing the data block to determine whether it is a predetermined special pointer. For each specially allocated block, the process proceeds to step 925. Otherwise, the process continues at step 930, as described below.

At step 925, for each block that is specially allocated, the storage manager 300 reads the block 410 from SAD buffer 245. Then, the process continues at step 945, as described below.

At step 930, for each block that is not specially allocated, the storage manager 300 determines whether the block is stored in the buffer cache 240. For each block that is stored in the buffer cache 240, the process proceeds to step 935. Otherwise, the process continues at step 940, as described below.

At step 935, for each block that is stored within the buffer cache 240, the storage manager 300 reads the block from the buffer cache 240. Then, the process continues at step 945, as described below.

At step 940, for each block that is not specially allocated or stored within the buffer cache 240, the storage manager 300 retrieves the block from disk 120. Then, the process proceeds to step 945.

At step 945, the storage manager 300 determines whether there are more blocks to load. If there are more data blocks to load, the process proceeds to step 950. At step 950, the storage manager 300 selects the next block. Then the process proceeds to step 920, as described above. Otherwise, if there are no more blocks to load at step 945, the process proceeds to step 955. At step 955, the storage server 100 returns the requested data blocks to the client 130. Then the process ends.

Thus, a system and method for specially allocating data has been described. Note that references in this specification to "an embodiment", "one embodiment", "some embodiments", or the like, mean that the particular feature, structure or characteristic being described is included in at least one embodiment of the present invention. Occurrences of such phrases in this specification do not necessarily all refer to the same embodiment. Although the technology introduced herein has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

We claim:

1. A method in a computing system for specially allocating data within the computing system, comprising:

receiving, by an allocation component executing on a processor of the computing system, a request from a client to write a set of data blocks in a storage subsystem of the computing system, the storage subsystem including a non-volatile mass storage facility, the set of data blocks including a data block that includes data previously designated as special data, wherein the special data is pre-allocated in the non-volatile mass storage facility; and for each data block in the set of data blocks, comparing, by the allocation component executing on the processor of the computing system, the data block to the special data, when the data is determined to match the special data, assigning a special block pointer to the data block, the special block pointer pointing to a block address in the non-volatile mass storage facility, the special block pointer indicating that the corresponding data block was pre-allocated in the storage subsystem of the computing system, the special block pointer further indicating that an instance of the special data is stored in a memory of the computing system, wherein the memory is separate from the storage subsystem;

preventing the data block from being written to the storage subsystem as a result of the received request;

in response to receiving a request to read a data block from the non-volatile mass storage facility, the data block having a block pointer pointing to a block address in the non-volatile mass storage facility on which the data block is stored;

comparing the block pointer to the special block pointer to determine whether the data block includes contents that match the contents of the pre-allocated data block; and when the block pointer matches the special block pointer, reading the contents of the pre-allocated data block from the memory of the computing system without issuing a request to read the contents of the pre-allocated data block from the non-volatile mass storage facility.

2. The method of claim 1 further comprising when the data is determined not to match the special data, storing the data block in the storage subsystem of the computing system.

3. The method of claim 1 wherein the special data is a header file.

4. The method of claim 1 wherein the special data is a zero-filled block of data.

5. The method of claim 4 wherein the received request is associated with the client creating a virtual disk image file of a virtual machine.

6. The method of claim 1 wherein comparing the data to the special data includes computing a hash of the data and comparing the hash to a hash of the special data.

7. The method of claim 1 wherein preventing the data block from being written to the storage subsystem includes removing the data block from a buffer cache of the computing system, wherein the buffer cache is used by the computing system to store data blocks that are to be written to the storage subsystem during a consistency point.

8. The method of claim 7 wherein the method is performed prior to the consistency point.

9. The method of claim 7 wherein the method is performed during the consistency point and prior to completion of the consistency point.

10. The method of claim 1 wherein the special data has been designated as special by virtue of having satisfied a special block sharing criterion.

11. The method of claim 10 wherein the computing system is a storage server.

12. A storage system, comprising:
a processor;
a network communication interface to provide the storage system with data communication with at least one client over a network;
a storage interface to provide the storage system with data communication with one or more mass storage devices, wherein the one or more mass storage devices includes a pre-allocated data block of special data;
a memory including contents of the pre-allocated data block, wherein the memory is separate from the one or more mass storage devices; and
special allocation code that, when executed by the processor, causes the storage system to execute a special allocation process in response to a request received from the at least one client to write data to the one or more mass storage devices, the data including at least one portion of data that matches the contents of the pre-allocated data block, the process including:
for each portion of data, comparing the portion of data to the contents of the pre-allocated data block,
when the portion of data is determined to match the contents of the pre-allocated data block,
assigning a special block pointer to the portion of data, the special block pointer pointing to a block address in a non-volatile mass storage device, wherein the special block pointer identifies a location at which the contents of the pre-allocated data block are stored in the one or more mass storage devices, wherein the special block pointer indicates that an instance of the pre-allocated data block is stored in the memory of the storage system;
when the portion of data is determined not to match the contents of the pre-allocated data block, issuing a request to allocate storage in the one or more mass storage devices to which the portion of data is to be written;
in response to receiving a request to read a portion of data from the one or more mass storage devices, the portion of data having a block pointer identifying a location of the one or more mass storage devices on which the portion of data is stored;
comparing the block pointer to the special block pointer to determine whether the portion of data matches the contents of the pre-allocated data block; and
when the block pointer matches the special block pointer, reading the contents of the pre-allocated data block from the memory of the storage system without issuing a request to read the contents of the pre-allocated data block from the one or more mass storage devices.

13. The storage system of claim 12 wherein the storage system further includes a buffer cache to store data that is to be written to the one or more mass storage devices during a consistency point event, and wherein, when the portion of data is determined to match the contents of the pre-allocated data block, the portion of data is removed from the buffer cache prior to being written to the one or more mass storage devices.

14. The storage system of claim 13 wherein the process is performed prior to the consistency point event.

15. The storage system of claim 13 wherein the process is performed during the consistency point event and prior to completion of the consistency point.

16. The storage system of claim 12 wherein the storage system further comprises a deduplication component, and wherein the process substantially reduces redundant allocation and deallocation of the pre-allocated data block in the one or more mass storage device of the storage system.

17. The method of claim 1, wherein the memory is a random access memory of the computing system.

18. The storage system of claim 12, wherein the memory is a random access memory of the storage system.

* * * * *